(12) United States Patent
Plumpton

(10) Patent No.: US 7,914,271 B2
(45) Date of Patent: Mar. 29, 2011

(54) GATE INSERT HEATING AND COOLING

(75) Inventor: James Osborne Plumpton, Enosburg Falls, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 101 days.

(21) Appl. No.: 11/946,886

(22) Filed: Nov. 29, 2007

(65) Prior Publication Data

US 2009/0140465 A1   Jun. 4, 2009

(51) Int. Cl.
*B29C 45/74* (2006.01)

(52) U.S. Cl. ........................ 425/144; 425/549

(58) Field of Classification Search ............... 264/328.1, 264/40.6, 327; 425/144, 549
See application file for complete search history.

(56) References Cited

U.S. PATENT DOCUMENTS

| | | | |
|---|---|---|---|
| 3,661,487 A | 5/1972 | Susin | |
| 3,804,362 A | 4/1974 | Stromblad et al. | |
| 4,162,700 A | 7/1979 | Kahn | |
| 5,176,839 A * | 1/1993 | Kim | 249/78 |
| 5,228,923 A | 7/1993 | Hed | |
| 5,675,972 A | 10/1997 | Edelson | |
| 6,220,850 B1 * | 4/2001 | Catoen et al. | 425/549 |
| 6,238,613 B1 | 5/2001 | Batchelder et al. | |
| 6,876,123 B2 | 4/2005 | Martinovsky et al. | |
| 7,462,026 B2 | 12/2008 | Lin | |
| 7,471,035 B2 | 12/2008 | Wirz | |
| 7,523,617 B2 | 4/2009 | Venkatasubramanian et al. | |
| 7,578,960 B2 | 8/2009 | Forbes Jones et al. | |
| 2002/0139123 A1 * | 10/2002 | Bell | 62/3.7 |
| 2002/0189781 A1 | 12/2002 | Shibata et al. | |
| 2004/0076214 A1 | 4/2004 | Bell | |
| 2004/0080065 A1 * | 4/2004 | Kim | 264/40.1 |
| 2005/0172991 A1 | 8/2005 | Arai et al. | |
| 2006/0243316 A1 | 11/2006 | McCullough | |
| 2009/0272228 A1 | 11/2009 | Forbes Jones et al. | |
| 2009/0292335 A1 | 11/2009 | Leonov | |

* cited by examiner

*Primary Examiner* — Yogendra N Gupta
*Assistant Examiner* — Emmanuel S Luk

(57) ABSTRACT

Disclosed, amongst other things, is a gate insert of an injection mold that includes a base member. The base member defines a nozzle interface for receiving, in use, a nozzle of a melt distribution system that is heated, in use, by a heater, and a gate, the gate configured to fluidly link, in use, a melt channel of the nozzle with a molding cavity. The gate insert further includes a thermal regulator associated with the base member, the thermal regulator includes a direct energy conversion device that is capable of heating and cooling, wherein the thermal regulator is controllably operable, in use, to control the temperature of the gate.

7 Claims, 2 Drawing Sheets

GATE INSERT HEATING AND COOLING

TECHNICAL FIELD

The present invention generally relates to, but is not limited to, molding systems, and more specifically the present invention relates to, but is not limited to, (i) a gate insert, (ii) an injection mold including the gate insert, (iii) an injection molding system including the injection mold, and (iv) a method of injection molding a molded article in the injection molding system, amongst other things.

BACKGROUND

A typical gate insert of an injection mold includes a base member that defines a nozzle interface and a gate. The nozzle interface receives, in use, a nozzle of a melt distribution system such as a hot runner. The nozzle is typically heated, in use, by a heater. The gate is configured to fluidly link a melt channel of the nozzle with a molding cavity.

Good temperature control of the gate is an important aspect to efficiently mold a molded article of high quality. The ability to quickly and accurately control gate temperature has a material affect on aspects of injection molding that include cycle time, prevention of pre-mature gate freeze-off, preventing stringing/drooling from gate, minimizing gate vestige, ensuring a good temperature control of resin into mold, and the minimization of pressure drop. The migration of heat between the nozzle interface (heated by virtue of contact with the heated nozzle) is a factor, amongst others, that influences gate temperature control.

A known approach to gate temperature control has been to provide a high thermal conductivity nozzle with a low thermal conductivity gate seal, and a responsive nozzle heat control structure (e.g. a heater, heater controller, and temperature sensor arrangement) wherein the nozzle has a strict thermal profile.

Another known approach to gate temperature control has been to provide an insulating space between the nozzle and the gate insert within which air or solidified resin is provided to insulate the gate.

Another known approach to gate temperature control has been to provide a fluid channel around the gate insert that functions to cool the gate.

Another known approach to gate temperature control has been to provide an internally heated nozzle tip that functions to heat the gate area only during intervals of injection of molding material into the molding cavity.

Another known approach to gate temperature control has been to provide a low conductivity insert for insulating the gate from the mold.

Another known approach to gate temperature control has been to provide a high conductivity insert that is configured to conduct heat from the gate to cooling channels.

Even with these, and other, approaches available to those skilled in the art with which to control gate temperature, research and investigation has continued into new and improved structures and/or steps for ever more precise gate temperature control. One such investigation undertaken by the inventor has been into the application of direct energy conversion devices (i.e. devices that directly convert thermal energy into electrical energy—like a heat pump) for the new use of controlling gate temperature in an injection mold.

Examples of prior use of direct energy conversion devices, of the thermoelectric type, in the field of injection molding include the following:

U.S. Pat. No. 3,661,487 (Inventor: SUSIN, Victor et al.; Published: May 9, 1972) describes that high pressure tubing for carrying a plasticized material can be surrounded by thermoelectric material rather than fluid carrying tubing. The thermoelectric material is placed contiguous to a runner plate which is maintained at a higher temperature than the temperature of the runner. The thermoelectric material takes advantage of the Peltier effect and comprises junctions of two dissimilar metals. When electric current passes through the junctions in a first direction then one junction cools while the other heats. A reversal of current causes the warm junction to cool and the cool junction to heat. The thermoelectric material is operated to maintain the plasticized material at a desired temperature since a power supply can be used to selectively supply current in a forward or reverse direction as desired to heat or cool the plasticized material as required.

U.S. Pat. No. 3,804,362 (Inventor: STROMBLAND, John; et al.; Published: Apr. 16, 1974) describes dividing a part of a casting mould into two thermally insulated sections, one being a part of the actual mould portion having a moulding space, and that between the sections so-called Peltier elements are arranged, with the heat-emitting and heat-absorbing parts, respectively, in contact with each section, and that the current direction through the elements is reversible in order to change from cooling to heating, or vice versa, of the moulding space section. The operation of the Peltier element makes it possible rapidly to raise or lower the temperature in the mould and thus achieve rapid production with high quality.

U.S. Pat. No. 5,176,839 (Inventor: KIM, Bang et al.; Published: Jan. 5, 1993) describes core halves of a mold having cooling lines for receiving a cooling fluid to reduce cycle time. In addition, a thermoelectric device may be disposed between the core halves and respective insulating layers to provide fast cooling, thereby reducing cycle time.

U.S. Pat. No. 6,238,613 (Inventor: BATCHELDER, John, Samuel; Published: May 29, 2001) describes an extrusion device for extrusion of thermoplastic in a predetermined spatial pattern under computer control. A heat sink cools a valve region of a flow channel within the apparatus to a temperature below the lowest flowable temperature of the thermoplastic. A heater thermally contacting the valve region creates a thermal valve. The heat sink may be maintained at a desired low temperature using a flowing thermal fluid, such as water, or using any other active cooling technique known to those skilled in the art, such as air cooling, thermoelectric cooling, refrigeration or conduction cooling.

More generally, the structure and operation of thermoelectric devices are discussed, for example, with reference to the following:

U.S. Pat. No. 5,228,923 (Inventor: HED, Aharon; Published: Jul. 20, 1993) describes a structure and steps to withdraw large quantities of heat from a small surface with the use of planar thermoelectric cells. The structure provides a cylindrical refrigerator positioned concentrically within a closed end cylindrical structure. A heat exchange fluid is pumped through an inner hollow toward a closed end plate (cold plate) of an external cylinder and returns in the space between a bracing structure and an outer cylinder.

United States Patent Application No. 2004/0076214 (Inventor: BELL, Lon K et al.; Published: Mar. 22, 2004) describes a device for cooling and/or heating applications that includes thermoelectric elements, or modules, that are sandwiched between heat exchangers. The thermoelectric elements are advantageously oriented such that for any two elements sandwiching a heat exchanger, the same temperature type side faces the heat exchanger. A working medium is passed sequentially through at least two heat exchangers so that the cooling or heating provided is additive on the working medium.

United States Patent Application No. 2005/172991 (Inventor: ARAI, Tomohisa et al.; Published: Aug. 11, 2005) describes a thermoelectric element mountable to an object to be cooled, the thermoelectric element having a first heat transmitting member integrated with a heat radiating electrode and a second heat transmitting member integrated with a heat absorbing electrode are respectively provided to protrude outside the heat radiating electrode, further to a space outside the heat radiation side support member. The space is a radiation space in which a cooling medium exists.

Other examples of direct energy conversion devices include thermionic and thermotunneling devices, which are described, for example, with reference to the following:

U.S. Pat. No. 5,675,972 (Inventor: EDELSON, Jonathan Sidney; Published: Oct. 14, 1997) describes vacuum diode-based devices, including a vacuum diode heat pump and vacuum thermionic generators, are described in which the electrodes are coated with an electride.

U.S. Pat. No. 6,876,123 (Inventor: MARTINOVSKY, Artemy et al.; Published: Apr. 5, 2005) describes a thermotunneling converter is disclosed comprising a pair of electrodes having inner surfaces substantially facing one another, and a spacer or plurality of spacers positioned between the two electrodes, having a height substantially equal to the distance between the electrodes, and having a total cross-sectional area that is less than the cross-sectional area of either of the electrodes.

In the description that follows, the inventor will describe a novel structure and steps for gate temperature control in a gate insert that makes use of a direct energy conversion device.

SUMMARY

According to a first aspect of the present invention, there is provided a gate insert of an injection mold. The gate insert includes a base member, the base member defines a nozzle interface for receiving, in use, a nozzle of a melt distribution system that is heated, in use, by a heater. The base member defines a gate, the gate configured to fluidly link, in use, a melt channel of the nozzle with a molding cavity. The gate insert further includes a thermal regulator associated with the base member, the thermal regulator includes a direct energy conversion device that is capable of heating and cooling, wherein the thermal regulator is controllably operable, in use, to control the temperature of the gate.

According to a second aspect of the present invention, there is provided an injection mold that includes the gate insert in accordance with the first aspect of the present invention.

According to a third aspect of the present invention, there is provided an injection molding system that includes the injection mold in accordance with the third aspect of the present invention.

According to a fourth aspect of the present invention, there is provided a method of injection molding a molded article in an injection molding system. The injection molding system includes an injection mold with a gate insert. The gate insert including a base member that defines a nozzle interface and a gate. A nozzle is registered with the nozzle interface, the nozzle including a heater. The gate is configured to fluidly link a melt channel of the nozzle with a molding cavity defined by the injection mold. The gate insert further includes a thermal regulator associated with the base member and thermally linked thereto. The thermal regulator includes a direct energy conversion device that is capable of heating and cooling. The method includes the steps of closing the injection mold; driving the heater for heating the nozzle to maintain molding material in the melt channel at a molding temperature; driving the thermal regulator at a first time to heat the gate to a first temperature; injecting molding material through the gate from the melt channel and into the molding cavity to form the molded article; cooling the molded article, at least in part, in the molding cavity; driving the thermal regulator at a second time to cool the gate to a second temperature and substantially solidify any molding material therein; opening the injection mold; and removing the molded article from the injection mold.

A technical effect, amongst others, of the aspects of the present invention may include one or more of shorter cycle times, lower stress in the molded article, reduced drooling and stringing at the gate with the removal of the just-molded molded article, an increased ability to process hard to process resins, an injection mold having a simplified and therefore less expensive nozzle structure, and more generally a more precise control of the amount and duration of heating/cooling during the molding cycle that may afford the molder an increased ability, or window, within which to tune the performance of the melt distribution system to meet the molding application.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF THE EXEMPLARY EMBODIMENTS

Figure 1:
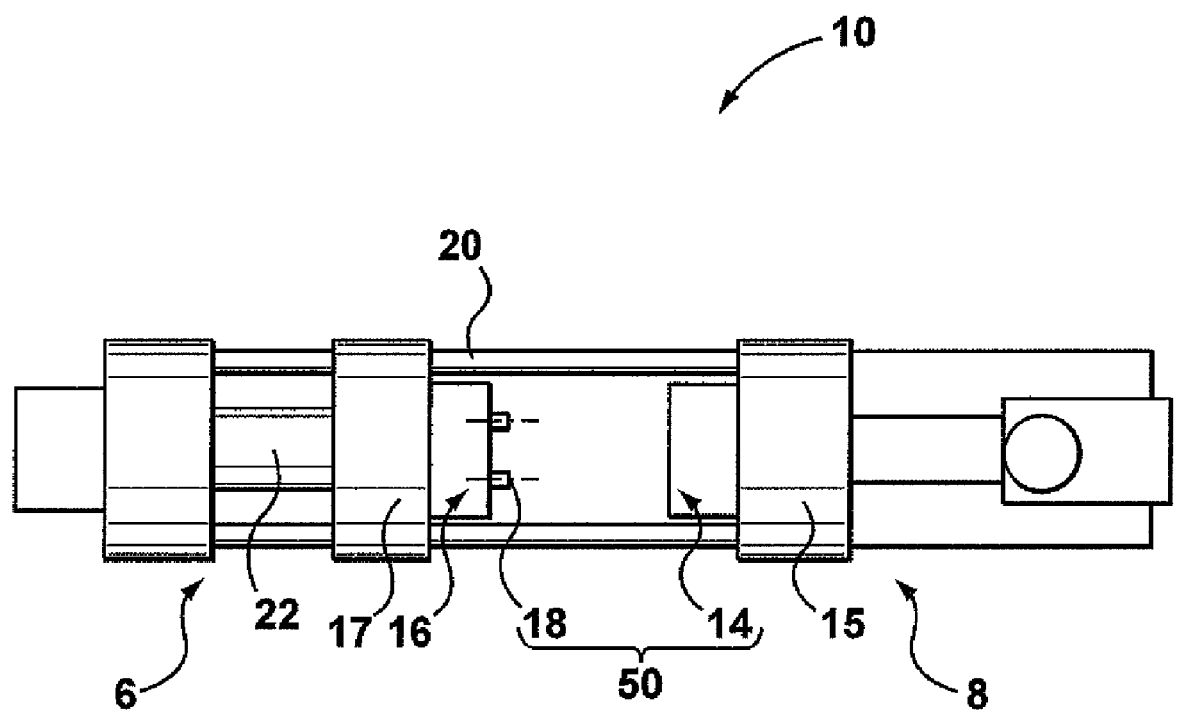
FIG. 1 is a plan view of an injection molding machine that includes an injection mold in accordance with a non-limiting embodiment of the present invention.
Figure 2:
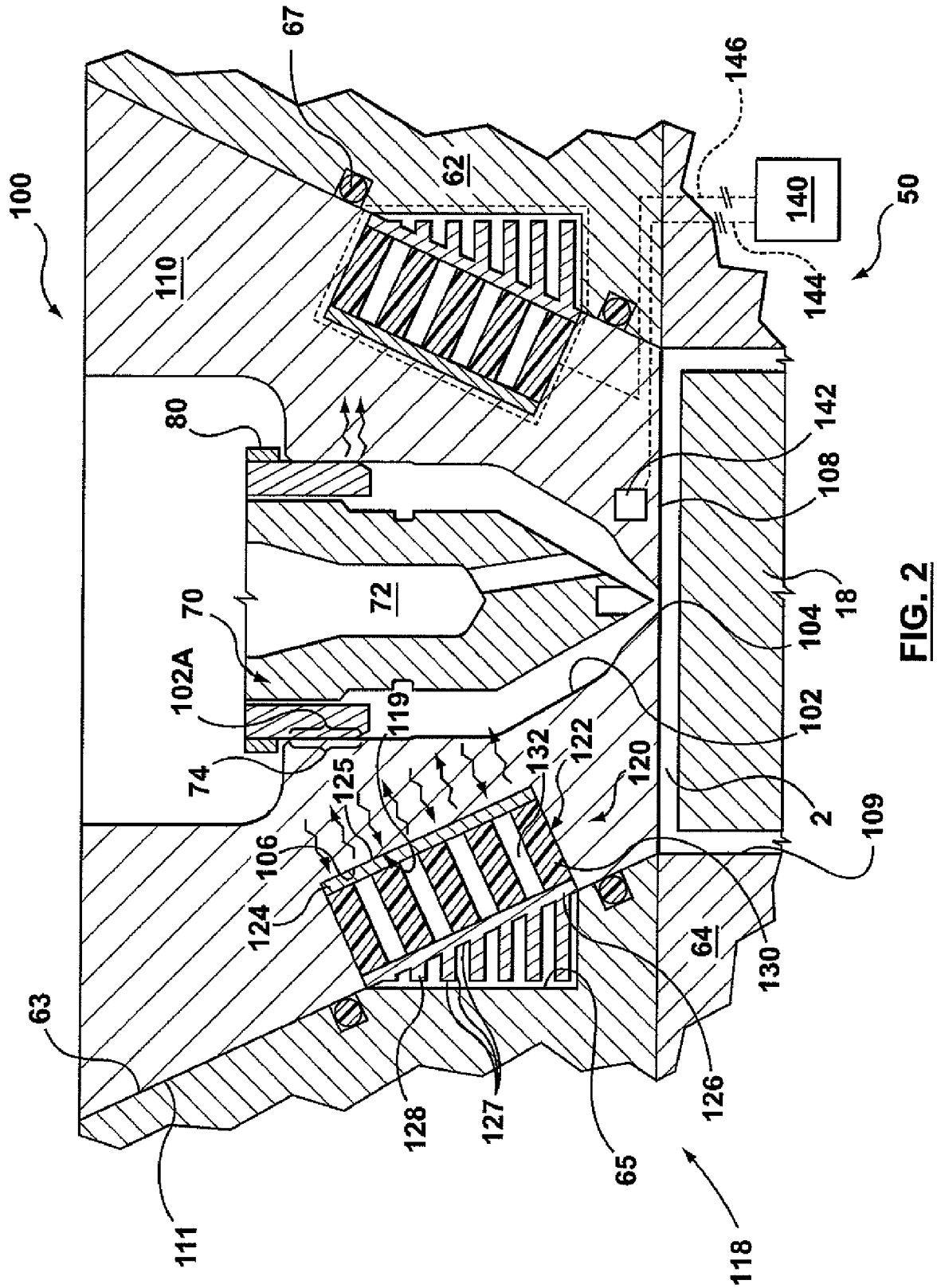
FIG. 2 is a section view through a portion of the injection mold of FIG. 1.

FIG. 1 depicts an injection molding system 10 in accordance with a non-limiting embodiment of the present invention for producing a molded article (not shown). The injection molding system 10 includes a mold clamp 6 with an injection mold 50 in accordance with a non-limiting embodiment of the present invention arranged therein. The injection mold 50 includes a first mold half 14 and a second mold half 16. The first and second mold halves 14, 16 are mounted on a stationary platen 15 and a moving platen 17 of the mold clamp 6, respectively. The first mold half 14 defines a plurality of female mold portions (shown in FIG. 2 as being provided by surface 108 of the base member 110 and surface 109 of a cavity insert 64 that is connected to a mold shoe member 62). The second mold half 16 defines a plurality of male mold portions (provided by outer surfaces of cores 18). The female mold portions cooperate, in use, with the corresponding plurality of male mold portions to define a corresponding plurality of molding cavities 2 (reference FIG. 2). The mold clamp 6 may be configured in accordance with a known mold clamp structure and/or steps that include a motive structure 22. The motive structure 22 is configured to position the moving platen 17, in use, relative to the stationary platen 15, and with it position the second mold half 16 relative to the first mold half 14, between a mold open configuration (as shown) and a mold closed configuration (FIG. 2). The motive structure 22 is further configured to clamp the first mold half 14 with the second mold half 16 in the mold closed configuration with the co-operation of tie-bars 20. The injection molding system 10 further includes an injection unit 8. The injection unit 8 may be configured in accordance with a known injection molding structure and/or steps to plasticize and inject, in use, a molding material into the injection mold 50.

FIG. 2 depicts a gate insert 100 in accordance with a non-limiting embodiment of the invention installed in the first mold half 14 of the injection mold 50. The gate insert 100 includes a base member 110. The base member 110 defines a nozzle interface 102 for receiving, as shown, a nozzle 70 of a melt distribution system. The nozzle 70 is heated, in use, by a heater 80. The base member 110 defines a gate 104, the gate 104 configured to fluidly link, in use, a melt channel 72 of the nozzle 70 with a molding cavity 2. The gate insert 100 further includes a thermal regulator 120 associated with the base member 110. The thermal regulator 120 includes a direct energy conversion device 122 that is capable of heating and cooling. The thermal regulator 120 is controllably operable, in use, to control the temperature of the gate 104.

The base member 110 defines a mold mating interface 111 on an outer surface thereof, the mold mating interface 111 is configured to cooperate, in use, with a gate insert interface 63 defined by an inner surface of the mold shoe member 62, of the first mold half 14, for locating, in use, the gate insert 100 therein.

The base member 110 defines a thermal regulator interface 106. The thermal regulator 120 includes a first heat transfer interface 125. The first heat transfer interface 125 and the thermal regulator interface 106 are configured to cooperate, in use, to thermally link the base member 110 and the thermal regulator 120. The thermal regulator 120 also includes a second heat transfer interface 127 that is configured to thermally link, in use, with a heat body (i.e. heat source or heat sink).

The thermal regulator interface 106 is located on the base member 110 between a nozzle contact portion 102A of the nozzle interface 102 and the gate 104. The nozzle contact portion 102A contacts, in use, a gate insert contact interface 74 of the nozzle 70 for aligning the nozzle 70 with the gate 104. In so doing, the heated nozzle 70 is thermally linked with the base member 110.

The thermal regulator 120 includes a first heat exchange member 124 and a second heat exchange member 126 with the direct energy conversion device 122 arranged between, and thermally linked with, the first heat exchange member 124 and the second heat exchange member 126.

In accordance with the non-limiting embodiment, the direct energy conversion device 122 is of a thermoelectric type and includes a first plurality of P-type thermoelectric elements 130 and second plurality of N-type thermoelectric elements 132. The first plurality of P-type thermoelectric elements 130 and the second plurality of N-type thermoelectric elements arranged in an alternating stacked relation thereof. Alternatively, the direct energy conversion device may be similarly constructed using a known thermionic device, thermotunneling device, or any combination or permutation thereof.

Accordingly, the injection molding system 10 further includes a controller 140 connected to the thermal regulator 120 by control link 146. The controller 140 is configured to control the thermal regulator 120 by varying the polarity and magnitude of an applied current thereto.

The base member 110 defines a first pocket 119 around a periphery thereof, the first pocket 119 configured to receive the thermal regulator 120, the thermal regulator interface 106 provided by a surface of the first pocket 119. The first pocket 119 formed through the outer surface of the base member 110 that provides the mold mating interface 111.

In accordance with the non-limiting embodiment, the heat body is a circulatable fluid, such as air or water. Accordingly, the second heat transfer interface 127 defines a channel, at least in part, for the circulation of the circulatable fluid. The second heat exchange member 126 includes a plurality of radial fins 128 and the second heat transfer interface 127 is defined by outer surfaces of the plurality of radial fins 128. At least a subset of the plurality of the radial fins 128 (in this case all) extending outwardly of the mold mating interface 111 for placement, as shown, within a second pocket 65 that is defined through the inner surface of the mold shoe member 62 that provides the gate insert interface 63. Accordingly, the second pocket 65 cooperates with the second heat transfer interface 127 to define the channel for the circulation of the circulatable fluid. A seal member 67 is disposed in a pocket defined in the mold shoe member 62, through the gate insert interface 63, for sealing the channel.

In accordance with the non-limiting embodiment, the thermal regulator 120 is configured to have a generally annular cross-section, the first heat transfer interface 125 has a conical shape, and the thermal regulator interface 106 of the base member 110 has a complementary conical shape to the first heat transfer interface 125. Those skilled in the art will recognize that other shapes for the thermal regulator 120 and interface configurations with respect to the base member 110 are possible.

In accordance with the non-limiting embodiment, the base member 110 includes a temperature sensor 142, such as a thermocouple, arranged therein for monitoring the temperature of the gate 104. Accordingly, the controller 140 is connected to the temperature sensor 142 by control link 144 that is arranged in the base member 110.

In operation, the temperature at the gate 104 can be controlled by controlling the thermal regulator 120 either manually or with the temperature controller 140.

A method of injection molding a molded article in the injection molding system 10, includes the steps of: i) closing the injection mold 50; ii) driving the heater 80 for heating the nozzle 70 to maintain molding material in the melt channel 72 at a molding temperature; iii) driving the thermal regulator 120 at a first time to heat the gate 104 to a first temperature; iv) injecting molding material through the gate 104 from the melt channel 72 and into the molding cavity 2 to form the molded article; v) cooling the molded article, at least in part, in the molding cavity 2; vi) driving the thermal regulator 120 at a second time to cool the gate 104 to a second temperature and substantially solidify any molding material therein; vii) opening the injection mold 50; and viii) removing the molded article from the injection mold 50.

The method may further include the steps of operating the controller 140 for generating a first control signal at the first time for controlling the thermal regulator 120 to heat the gate 104, driving the thermal regulator 120 with the first control signal. Likewise, the controller 140 generating a second control signal at the second time for controlling the thermal regulator 120 to cool the gate 104, and driving the thermal regulator 120 with the second control signal.

The method may further include the steps of selecting the first temperature and the second temperature for operation of the gate 104 for thermal shut-off.

The method may further include the steps of generating a feedback signal at the temperature sensor 142 representative of the temperature of the gate 104 and transmitting the feedback signal to the controller 140. The controller 140 generating at least one of the first control signal or the second control signal responsive to the feedback signal, wherein the temperature of the gate 104 is actively controlled.

The method may further include the steps of driving the thermal regulator 120 during at least one of the first time and the second time includes a pulsed operation of the thermal regulator 120. A technical effect of a pulsed operation of the thermal regulator 120 may include reduced gate freeze-off with hard to process resins.

A technical effect, amongst others, of the present invention may include one or more of shorter cycle times, lower stress in the molded article, reduced drooling and stringing at the gate with the removal of the just-molded molded article, an increased ability to process hard to process resins, an injection mold having a simplified and therefore less expensive nozzle structure (i.e. nozzle may not require a high thermal conductivity tips wherein stronger, less conductive steels could be used), and more generally the molder will have an increased ability, or window, within which to tune the performance of the melt distribution system to meet the molding application.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims.

What is claimed is:

1. A gate insert of an injection mold, the gate insert comprising:
a base member; the base member defines a nozzle interface for receiving, in use, a nozzle of a melt distribution system that is heated, in use, by a heater; the base member defines a gate, the gate configured to fluidly link, in use, a melt channel of the nozzle with a molding cavity;
a thermal regulator associated with the base member; and the thermal regulator includes a direct energy conversion device that is capable of heating and cooling; wherein, the thermal regulator is controllably operable, in use, to control a temperature of the gate; and
a controller is connected to the thermal regulator, the controller is configured to control, in use, the thermal regulator by varying polarity and magnitude of an applied current to the thermal regulator,
the controller is connected to a temperature sensor, the temperature sensor is arranged in the base member, the temperature sensor monitors, in use, the temperature of the gate defined by the base member,
the controller is operable for generating a first control signal at a first time and drive the thermal regulator with the first control signal for controlling the thermal regulator to heat the gate,
the controller is operable for generating a second control signal at a second time and drive the thermal regulator with the second control signal for controlling the thermal regulator to cool the gate, and
the temperature sensor is configured to:
 (i) generate, in use, a feedback signal to the controller, the feedback signal is representative of the temperature of the gate, and
 (ii) transmit the feedback signal to the controller, and the controller generates at least one of the first control signal and the second control signal responsive to the feedback signal, wherein the temperature of the gate is actively controlled.

2. A gate insert of an injection mold, the gate insert comprising:
a base member;
the base member defines a nozzle interface for receiving, in use, a nozzle of a melt distribution system that is heated, in use, by a heater;
the base member defines a gate, the gate configured to fluidly link, in use, a melt channel of the nozzle with a molding cavity;
a thermal regulator associated with the base member; and
the thermal regulator includes a direct energy conversion device that is capable of heating and cooling;
wherein, the thermal regulator is controllably operable, in use, to control a temperature of the gate,
wherein:
the base member defines a thermal regulator interface;
the thermal regulator includes a first heat transfer interface;
the first heat transfer interface and the thermal regulator interface are configured to cooperate, in use, to thermally link the base member and the thermal regulator;
the thermal regulator includes a second heat transfer interface;
the second heat transfer interface configured to thermally link, in use, with a heat body;
the thermal regulator includes:
 a first heat exchange member;
 a second heat exchange member; and
 the direct energy conversion device is arranged between, and thermally linked with, the first heat exchange member and the second heat exchange member;
the direct energy conversion device includes a first plurality of P-type thermoelectric elements and second plurality of N-type thermoelectric elements, the first plurality of P-type thermoelectric elements and the second plurality of N-type thermoelectric elements arranged in an alternating stacked relation thereof;
the heat body is a circulatable fluid;
the second heat transfer interface defines a channel, at least in part, for a circulation of the circulatable fluid;
the second heat exchange member includes a plurality of radial fins; and
the second heat transfer interface is defined by outer surfaces of the plurality of radial fins;
the base member defines a first pocket around a periphery thereof, the first pocket configured to receive the thermal regulator, the thermal regulator interface provided by a surface of the first pocket;
the base member defines a mold mating interlace on an outer surface thereof, the mold mating interface is configured to cooperate, in use, with a gate insert interface defined by an inner surface of a mold shoe member, of the injection mold, for locating, in use, the gate insert therein;

at least a subset of the plurality of radial fins extending outwardly of the mold mating interlace for placement, in use, within a second pocket that is defined through the inner surface of the mold shoe member that provides the gate insert interface; and the second pocket cooperates with the second heat transfer interface to define the channel for the circulation of the circulatable fluid;

a controller is connected to the thermal regulator, the controller is configured to control, in use, the thermal regulator by varying polarity and magnitude of an applied current to the thermal regulator, the controller is connected to a temperature sensor, the temperature sensor is arranged in the base member, the temperature sensor monitors, in use, the temperature of the gate defined by the base member, the controller is operable for generating a first control signal at a first time and drive the thermal regulator with the first control signal for controlling the thermal regulator to heat the gate, the controller is operable for generating a second control signal at a second time and drive the thermal regulator with the second control signal for controlling the thermal regulator to cool the gate, and the temperature sensor is configured to:
  (i) generate, in use, a feedback signal to the controller, the feedback signal is representative of the temperature of the gate, and
  (ii) transmit the feedback signal to the controller, and the controller generates at least one of the first control signal and the second control signal responsive to the feedback signal, wherein the temperature of the gate is actively controlled.

3. The gate insert of claim 2, wherein:
the thermal regulator is configured to have a generally annular cross-section, the first heat transfer interface has a conical shape, and the thermal regulator interface of the base member has a complementary conical shape to the first heat transfer interface.

4. The gate insert of claim 2, wherein:
the base member includes a surface that defines a portion of the molding cavity.

5. The gate insert of claim 2, wherein:
the direct energy conversion device is at least one of:
  a thermoelectric device;
  a thermotunneling device; or
  a thermionic device.

6. A mold including the gate insert in accordance with any one of claims 1, 2, 3, 4, 5.

7. An injection molding system having a mold including the gate insert in accordance with any one of claims 1, 2, 3, 4, 5.

* * * * *